Patented Aug. 6, 1940

2,210,659

UNITED STATES PATENT OFFICE 2,210,659

STARCH HYDROLYSIS

Walter R. Fetzer, Clayton, Mo., assignor to Union Starch and Refining Company, Columbus, Ind., a corporation of Indiana No Drawing. Application July 5, 1938, Serial No. 217,603

6 Claims. (Cl. 127—38)

This invention relates to the production of dextrose from starch by acid hydrolysis in a manner such that the reaction may be caused to proceed at least approximately to theoretical expectations. That is to say, by the practice of the invention, an actual yield of dextrose may be obtained from the starch which is substantially the theoretical yield.

One object of the invention is to provide a simple and commercially practical method of producing dextrose from starch that will obtain substantially the theoretical yield of dextrose from the starch. For instance, this may be contrasted with present practice wherein yields of below 90% of theoretical are considered satisfactory.

More specifically, it is an object of the invention to provide a method of producing sugar from starch that reduces, or eliminates, the formation of so-called reversion products.

A further object is to provide a method of hydrolysis for obtaining the foregoing results without requiring extensive equipment additional to or in lieu of that now employed.

A further object is to provide a system of starch hydrolysis in which a material, preferably reversion products of a previous hydrolysis, is added in successive hydrolyses, in such manner as to reduce or eliminate the formation of additional reversion products during such successive hydrolyses.

It is a further object to provide a method of starch hydrolysis wherein an equilibrium factor for the reaction involved is supplied as a separate step in the process, so as to reduce or eliminate the formation of such an equilibrium factor during hydrolysis.

Heretofore it has been the practice to hydrolyze starch in the presence of water with added acid. A representative procedure is to take purified starch as from a wet corn milling process and resuspend the same in water to form a slurry ranging from 12° to 18° Bé. (at 100° F.). To a proper amount of such suspension is added a quantity of muriatic acid, food grade (18° Bé. at 60°). The mixture is run into a pressure vessel or converter, live steam introduced, until a pressure of 40# is reached (287° F.). After a period ranging from twenty to thirty minutes, the contents of the converter, now a thin syrup, is discharged and the acid neutralized to a pH of 4.6–5.2. This sugar syrup is then refined by filtration and carbon treatments common to the industry and concentrated to the desired density or moisture content.

Corn sugars are marketed in three common grades, "70", "80" and refined corn sugar, the last being substantially pure dextrose.

When producing "70" sugar the above mentioned syrup is concentrated to a moisture content of approximately 18%. In the case of "80" sugar, the concentration is carried further to produce a moisture content of approximately 11%. The heavy syrup, after cooling and seeding, is run into pans or other suitable equipment wherein the formation of dextrose crystals takes place, occluding the uncrystallizable portion, so that the mass finally sets into a so-called "concrete." After a period of aging, the concrete becomes sufficiently hard to clip.

When producing refined corn sugar, the hydrolysis is carried as far as possible and the same procedure of neutralization, refining and concentration followed; but instead of being run into molds, crystallization is carried out in motion, producing a magma composed of dextrose crystals and uncrystallizable syrup containing dextrose and reversion products. The dextrose crystals are separated out by centrifugal processing and the uncrystallized syrup or mother liquor containing dextrose and reversion products, known to the industry as hydrol, is obtained.

It will be observed that this separation step is not a characteristic of the production of "70" and "80" sugars. In such, the hydrol remains with the dextrose crystals, since its presence does not reduce the qualities of those products below their standards.

Whether in the production of "70" or "80" sugar, or of refined corn sugar, the course of the hydrolysis is such that some of dextrose produced is diverted to the formation of reversion products mentioned above. The formation of these reversion products inhibits the maximum yield of dextrose from the starch. This is critical in the manufacture of "70" and "80" sugars, because of the reduction of both dextrose yield and total solids yield, but expecially so in the manufacture of refined corn sugar, since the hydrol obtained, containing reversion products, must be disposed of at a lesser value than dextrose, and the "70" and "80" sugars.

Obviously, it is desirable in the hydrolysis to obtain the highest possible yield of dextrose. The extent of the hydrolysis is measured by determining chemically the reducing sugars present, calculating the same as dextrose on a dry substance basis. The ratio of reducing sugars to total dry substance is known in the art by the term "dextrose equivalent," abbreviated as D. E.

The chemistry of the acid hydrolysis of starch may be expressed by the following empirical chemical formula number (1). Below each formula in the equation has been placed the molecular ratios of the substances involved:

| Starch | Water | Dextrose |
|---|---|---|
| $(C_6H_{10}O_5)n$ | $nH_2O$ | $NC_6H_{12}O_6$ |
| 162 | 18 | 180 |

The equation shows that 162 pounds of starch should theoretically give 180 pounds of dextrose, or that 100 pounds of pure starch should give theoretically 111.1 pounds of dextrose. Since the end products of the reaction are entirely dextrose, the D. E., that is, the ratio of dextrose to total dry substance of Equation 1 is 100. But, in the presently known procedure, such as that set out hereinabove, the theoretical yield of dextrose as shown in Equation 1 has not been achieved, because of the formation of reversion products.

For example, in the above described commercial process, the dextrose equivalent will usually range from 87–92, the higher ratios being obtained with lower concentrations of starch suspensions used in the hydrolysis, the remainder being what is known to those versed in the art as reversion products. The composition of the reversion products constituting 13–8 parts of the dry substance produced is not definitely known, but it is generally agreed that it is made up of reversion products of dextrose in the form of more complex carbohydrate units, such as polysaccharides, most likely disaccharides. There are conditions that indicate that the formation of these reversion products and the consequent reduction in the production of dextrose as such occurs because of the existence of a secondary reaction during hydrolysis. This secondary reaction may be stated theoretically at least as a reverse of Equation 1, in that these reversion products produce a loss rather than a gain in dextose, based upon theoretical yield.

In any event, there is a definite contribution by the dextrose produced or the starch to the formation of these reversion products, resulting in a reduction of the actual dextrose available as an end product. Thus, the net result is the failure to achieve the maximum amount of dextrose—111 pounds. This balance between dextrose produced and dextrose consumed, which reaches an equilibrium dependent upon conditions such as concentration of the starch slurry used, and the like, may be expressed in the following equilibrium equation, Number 2:

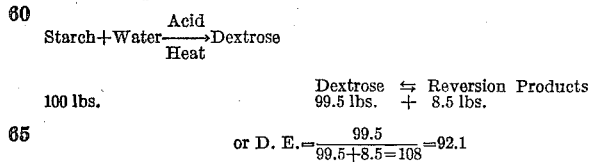

In the above Equation 2 and those to follow, wherein reversion products are shown, the reversion products are, for simplicity in calculation, assumed to have no reducing action, with all reducing action attributed to dextrose alone. Actually, this is not the case, as the reversion products are generally considered to have some reducing action. Also, for simplicity, there has been no separation of ash calculated. This generally is less than 1% of the total dry substance.

Equation 2 represents a typical reaction from the previously described commercial process of hydrolysis. It will be seen that 100 pounds of starch has produced only 99.5 pounds of dextrose, far below the ideal theoretical yield of 111 pounds. The difference between the theoretical yield of Equation 1 and this actual commercial yield is caused by the formation of the reversion products. Also it will be noted that the total dry substance obtained is only 108 pounds as compared with a theoretical 111 pounds.

The art has long sought a method that would produce a yield equal to the theoretical yield. These attempts have been made from the angle of obtaining a more perfect hydrolysis in the first instance, and also from the angle of later breaking down or reconverting the hydrol to effect a further recovery of dextrose therefrom. At best, these procedures have been successful only in a small measure.

A decrease in concentration of the starch suspension undergoing hydrolysis has been employed for reducing the amount of reversion products obtained. In fact, within the range of concentrations normally considered, the percentage of reversion products varies with the concentration of the starch suspension. Under the present practice, starch suspensions of densities as low as 12° Bé. are employed and with them dextrose equivalents of 92 are practical. Any effort to employ a lower density of starch suspension invokes the economic obstacle of the high cost of disposing later of the excess water; and yet even under conditions obtaining dextrose equivalents of 92, the amount of reversion products is very great. Consequently, any system that economically will, during hydrolysis, reduce or eliminate the formation of reversion products with their curtaining effect upon the efficient hydrolysis of starch is of outstanding significance from the standpoint of economical production of dextrose.

In the present invention, the reversion products produced in the acid hydrolysis of starch are assumed to be a fixed factor in the equilibrium, for a specific set of conditions, and it is assumed that if there be present initially in the chemical reaction of the hydrolysis some material acting as an equilibrium factor, no production of reversion products will ensue. Based upon this concept, the inclusion at the beginning of the hydrolysis, or prior to the termination of the hydrolysis reaction, of the end amount of reversion products, will supply this equilibrium factor, eliminating the necessity of producing the equilibrium products, and thereby enable the starch itself to be hydrolyzed to completion.

The chemical reaction of such a procedure may be expressed as follows (Equation 3):

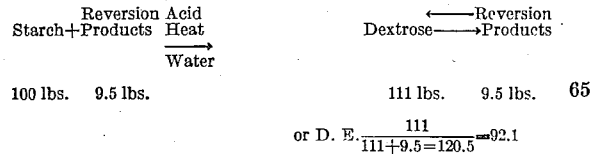

Thus, a 92 D. E. is obtained wherein the reversion products added have quite evidently acted on the end side of the reaction in the same manner as the reversion products formed by hydrolysis in Equation 2 above. However, it will be observed that 100 pounds of starch is here producing 111 pounds of dextrose, so that complete hydrolysis is being obtained and an actual yield of dextrose equal to the theoretical yield is had.

This reaction is proved to be true.

The process of the conventional hydrolysis, as given in Equation 2, where a D. E. of approximately 92 results with a starch suspension of 12° Bé., is demonstrated as follows:

To a starch suspension of 12° Bé. was added muriatic acid (18° Bé.) at a rate of 100 pounds per 2200 gallons of suspension. The suspension was hydrolyzed with results as follows:

| Time in minutes | 15 | 20 | 25 | 30 | 35 |
|---|---|---|---|---|---|
| Pressure on converter____pounds__ | 40 | 40 | 40 | 40 | 40 |
| pH before neutralization_____ | 1.5 | 1.5 | 1.5 | 1.5 | 1.5 |
| pH after neutralization_____ | 5.0 | 5.0 | 5.0 | 5.0 | 5.0 |
| Dextrose equivalent_____ | 87.3 | 89.6 | 91.8 | 92.2 | 91.5 |

Equilibrium, therefore, results at a D. E. of approximately 92, indicating the remainder of 8 parts of solids to be reversion products.

That a D. E. of approximately 92 is a reaction equilibrium for these conditions can be shown by submitting pure dextrose (D. E. 99.9+) to hydrolysis under the same conditions. A solution in 12° Bé. (100° F.), with acid added at the rate of 100 pounds per 2200 gallons, and conditions of the above test on starch duplicated, produces:

| Time in minutes | 5 | 10 | 20 | 30 |
|---|---|---|---|---|
| Pressure on converter_____pounds__ | 40 | 40 | 40 | 40 |
| pH before neutralization_____ | 1.4 | 1.4 | 1.4 | 1.4 |
| pH after neutralization_____ | 5.0 | 5.0 | 5.0 | 5.0 |
| Dextrose equivalent_____ | 94.2 | 93.6 | 92.8 | 92.3 |

The above data show that at 30 minutes the same amount of reversion products result, whether starch or pure dextrose is used as a starting material.

Thus inherently from any resultant practical solution of dextrose obtained through hydrolysis, a proportion of the dextrose is used in the production of reversion products which act as an equilibrium factor. It is evident that this proportion may be determined as above.

That the introduction of the reversion products with the starch suspension in a prescribed amount indicated by the equilibrium, initiates in advance the equilibrium which would otherwise be effected, as shown in Equation 3, resulting in a very nearly or complete hydrolysis of the starch itself, is demonstrated by the following:

Instead of reversion products, as such, which are not commercially attainable, hydrol, a syrup which, as stated above contains dextrose and said reversion products, was used, and in such proportions with the starch that the reversion products were present at the start in amounts indicated in the expected equilibrium. For this purpose, a hydrol was obtained having a low ash content (0.7%) and a D. E. of 51. The Baumé of this starch suspension with added hydrol was 12° (100° F.), with a ratio of 100 parts starch solids to 21.1 parts hydrol solids, the latter, having a 51 D. E., consisting of 10.8# of dextrose and 10.3# of reversion products. To this composite suspension was added muriatic acid (18° Bé. at 60° F.) at the rate of 100 pounds per 2200 gallons and hydrolysis made under identical conditions as previously shown. If the starch is theoretically hydrolyzed to dextrose under these conditions, the expected reaction can be expressed as follows (Equation 4):

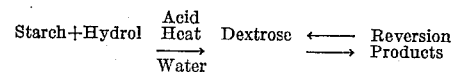

$$\text{or D. E.} \frac{111+10.8=121.8}{111+10.8+10.3=132.1}=92.2$$

The results obtained were:

| Time in minutes | 15 | 20 | 25 | 30 | 35 |
|---|---|---|---|---|---|
| Pressure on converter____pounds__ | 40 | 40 | 40 | 40 | 40 |
| pH before neutralization_____ | 1.4 | 1.4 | 1.4 | 1.4 | 1.4 |
| pH after neutralization_____ | 5.0 | 5.0 | 5.0 | 5.0 | 5.0 |
| Dextrose equivalent_____ | 88.3 | 90.2 | 92.0 | 92.0 | 91.8 |

The data show the amount of reversion products to be approximately the same before and after hydrolysis. The equilibrium D. E. is approximately the same as if straight starch suspension had been used, or in other words, the starch has been hydrolyzed to very nearly theoretical completion.

It is thus demonstrated that the added hydrol is not involved in the hydrolysis other than that the reversion products contained therein functioned from the start as do the reversion products formed in the conventional starch hydrolysis, enabling the primary reaction to go to completion. This is further demonstrated by the following operation on pure dextrose:

To a quantity of pure dextrose was added the above mentioned hydrol in such quantities that the resulting D. E. was reduced to 92 and the same diluted to 12° Bé. (100° F.). Muriatic acid was added as before—at the rate of 100 pounds per 2200 gallons—the mixture run into the converter, and treated as in the foregoing examples. The data obtained are in the following table:

| Time in minutes | 0 | 25 | 35 |
|---|---|---|---|
| Pressure on converter_____pounds__ | | 40 | 40 |
| pH before neutralization_____ | | 1.5 | 1.5 |
| pH after neutralization_____ | | 5.0 | 5.0 |
| Dextrose equivalent_____ | 92.7 | 92.3 | 92.4 |

The resulting D. E. is approximately 92 as in the foregoing.

In all of the above data, the comparison has been made on the basis of D. E. alone. This comparison has been shown to be reliable in another way. A hydrolysis of a straight starch suspension and one of a suspension containing both starch and hydrol in amounts and proportions as indicated above have been made in identical manner, the syrup refined and finished to sugar concrete. The resulting products have been analyzed for specific rotation—another method commonly used for evaluating carbohydrate products, with results as follows:

|  | Specific rotation |
|---|---|
| Straight starch sugar | 55.7 |
| Starch plus reversion products sugar | 55.7 |

Furthermore, commercial hydrol of high ash content may be used. As an instance, such hydrol may have a composition on a dry substance basis as follows:

| | |
|---|---|
| Reducing sugars as dextrose (D. E.) | 70.2 |
| Ash | 7.8 |
| Crude protein | 0.4 |
| Reversion products by difference | 21.6 |

Based on an anticipated equilibrium D. E. of approximately 92, it was calculated that a ratio of 100# of dry substance starch to 60.7# of dry substance of this hydrol (corrections having been made for additional ash) were necessary to initiate before hydrolysis the necessary final equilibrium condition. It was found necessary, however, to increase the amount of acid used in order to obtain the same hydrolyzing pH, because of buffer conditions created by this hydrol. Accordingly, to a 12° Bé. suspension of starch and commercial hydrol in these proportions was added muriatic acid at the rate of 120# per 2200 gallons, and hydrolysis was carried out as above. The results obtained, making necessary corrections for ash of the commercial hydrol to place the data on the same ash basis as the data above, follow:

| Time in minutes | 15 | 20 | 25 | 30 | 35 |
| --- | --- | --- | --- | --- | --- |
| Pressure on converters pounds | 40 | 40 | 40 | 40 | 40 |
| pH before neutralization | 1.4 | 1.4 | 1.4 | 1.4 | 1.4 |
| pH after neutralization | 5.0 | 5.0 | 5.0 | 5.0 | 5.0 |
| Dextrose equivalent | 88.5 | 90.9 | 92.1 | 92.3 | 92.1 |

It is obvious to those skilled in the art that other than equilibrium proportions of reversion products could be employed with the starch with desirable effect. In the case of a lesser amount of reversion products than that indicated by equilibrium amounts, the result would be that some of the dextrose produced from the starch would be required to form reversion products to aggregate the amount of reversion products necessary to fulfill the equilibrium conditions. Or, in other words, the starch would not be hydrolyzed to the theoretical amount of dextrose, the yield obtained lying between that obtained with a straight starch suspension and that obtained employing a combination of starch and reversion products in equilibrium proportions, according to the amount added. Likewise, when more reversion products are introduced with the starch than required for equilibrium conditions, the normal equilibrium would be formed by the formation of dextrose from the reversion products until equilibrium conditions are established. The starch used in such circumstances, contrary to the condition in which a lesser amount of reversion products was used, would be hydrolyzed to theoretical expectations.

The addition of the reversion products may be made at the start of the equilibrium, or later, so long as the hydrolysis reaction has not gone to an end.

It is at once apparent to one skilled in the art that advantages of this invention could be availed of in the production of the commercial corn sugars commonly known as "70" and "80", as well as in the manufacture of refined corn sugar or dextrose. Hydrol, the by-product of refined corn sugar or dextrose, commanding a comparatively low market value, could be utilized by those not producing refined corn sugar or dextrose to blend in equilibrium proportions with starch undergoing hydrolysis in the manufacture of the so-called "70" and "80" corn sugars to effect a very nearly complete hydrolysis of said starch, with attendant economies of manufacture. Likewise, the blending of other than equilibrium proportions of hydrol will proportionately effect the amount of dextrose produced from the starch in the ways hereinbefore set forth.

It is to be understood that, although in the above discussions corn starch has been referred to, this invention comprehends the use of starch from any source in the production of starch syrup and starch sugar.

Furthermore, the use of this invention is not limited by the discussion of any particular proportions of materials used. For example, starch substance or concentration other than 12° Be' could be used requiring only the alteration of the proportions of the other ingredients and, particularly, reversion products. Greater concentration in hydrolysis with attendant economies of operation, although producing more reversion products, are not so critical in the process of this invention, enabling a sense of the reversion products in the manner indicated.

Although it has been suggested herein that muriatic acid be used in the hydrolysis since this is common practice in the art, other acids may be used and may be desirable for reasons set out in the copending application of this inventor, Serial No. 317,668, filed February 7, 1940.

In the above examples, comparison has been made on the basis of an increased yield of dextrose obtained from the starch. It is at once obvious that with increased yield of dextrose, there occurs simultaneously an increased yield in dry substance. In other words, not only is there an economic gain through the elimination of reversion products in favor of dextrose, but more dry substance is obtained per pound of starch undergoing hydrolysis. For instance, Equation 2 represents the old process and produces 108# of dry substance from 100 pounds of starch, whereas Equation 3 represents the new process and produces 111#.

What is claimed is:

1. An acid process of hydrolyzing starch into dextrose including the steps of obtaining reversion products and dextrose from a run, and thereafter returning at least a substantial part of the reversion products obtained to a new run of starch to reduce the contribution of the starch to the formation of reversion products in such new run.

2. An acid process of hydrolyzing starch into sugar including the steps of adding reversion products in quantities greater than the equilibrium proportion normally produced by the starch suspension used, hydrolyzing said mixture, and producing thereby dextrose from the starch in substantially theoretical yield quantities, and additional dextrose from the reversion products.

3. A method for use in acid hydrolysis of starch, including the steps of predetermining the amount of reversion products normally to be expected from the starch suspension being hydrolyzed, providing such a quantity of reversion products in the hydrolysis by the separate addition thereof, and thereby producing dextrose from the starch in substantially theoretical quantities.

4. In the acid hydrolysis of starch, which hydrolysis normally involves the changing of starch into dextrose with the presence of reversion products in a proportion to the dextrose obtained determinable for the predetermined condition of the hydrolysis, the steps of adding to the hydrolysis reaction reversion products in an amount sufficient to enable at least a substantial part of the starch otherwise required for supplying dextrose for such reversion products to be converted and remain as dextrose.

5. In the acid hydrolysis of starch, which hydrolysis normally involves the changing of starch into dextrose with the presence of reversion products in a proportion to the total dextrose in the end of the reaction determinable for the predetermined conditions of the hydrolysis, the steps of adding hydrol having reversion products in an amount sufficient to enable at least a substantial part of the starch otherwise required for supplying dextrose for such reversion products to be converted into and remain as dextrose.

6. In an acid hydrolysis process of making relatively impure or unrefined corn sugar concrete from starch, the steps of extraneously adding reversion products to the hydrolysis reaction in an amount sufficient to enable at least a substantial part of the starch otherwise required for supplying reversion products to be converted into and remain as dextrose, causing said reaction to go to end incorporating sugar and reversion products, and crystallizing the mass.

WALTER R. FETZER.